United States Patent
Billmaier et al.

(10) Patent No.: US 6,710,815 B1
(45) Date of Patent: Mar. 23, 2004

(54) SYNCHRONIZING MULTIPLE SIGNALS RECEIVED THROUGH DIFFERENT TRANSMISSION MEDIUMS

(75) Inventors: James A. Billmaier, Woodinville, WA (US); Brittany R. Billmaier, Woodinville, WA (US)

(73) Assignee: Digeo, Inc., Kirkland, WA (US)

( * ) Notice: Subject to any disclaimer, the term of this patent is extended or adjusted under 35 U.S.C. 154(b) by 359 days.

(21) Appl. No.: 09/778,994

(22) Filed: Feb. 7, 2001

Related U.S. Application Data

(63) Continuation-in-part of application No. 09/768,019, filed on Jan. 23, 2001.

(51) Int. Cl.[7] .......................... H04N 9/475; H04N 7/10; H04N 7/173
(52) U.S. Cl. .......................... 348/515; 348/485; 725/32; 725/110
(58) Field of Search ................ 348/515, 485, 348/553, 738, 465, 462; 725/32, 109–111, 51, 61

(56) References Cited

U.S. PATENT DOCUMENTS

| | | | |
|---|---|---|---|
| 4,682,370 A | 7/1987 | Matthews | 455/166 |
| 5,440,351 A | 8/1995 | Ichino | 348/729 |
| 5,818,441 A | 10/1998 | Throckmorton et al. | 345/328 |
| 5,818,935 A | 10/1998 | Maa | 380/20 |
| 5,894,320 A | 4/1999 | Vancelette | 348/7 |
| 5,907,351 A * | 5/1999 | Chen et al. | 348/14 |
| 5,930,444 A | 7/1999 | Camhi et al. | 386/46 |
| 5,987,509 A | 11/1999 | Portuesi | 709/217 |
| 6,018,768 A | 1/2000 | Ullman et al. | 709/218 |
| 6,209,028 B1 | 3/2001 | Walker et al. | 709/219 |
| 6,266,753 B1 * | 7/2001 | Hicok et al. | 711/202 |
| 6,452,974 B1 * | 9/2002 | Menon et al. | 375/240.28 |

* cited by examiner

Primary Examiner—Victor R. Kostak
(74) Attorney, Agent, or Firm—Kory D. Christensen; Stoel Rives LLP

(57) ABSTRACT

Multiple signals received through different transmission mediums are synchronized within a set top box (STB) for subsequent mixing and presentation. For example, a video program transmitted via a cable network is synchronized with a secondary audio program, such as a radio program, received via the Internet. In another example, a video program transmitted via a cable network is synchronized with one or more programmed events, such as directives to display text or graphics or animation, play streaming media, direct a browser to a particular web page, and the like.

20 Claims, 10 Drawing Sheets

SYNCHRONIZING MULTIPLE SIGNALS RECEIVED THROUGH DIFFERENT TRANSMISSION MEDIUMS

RELATED APPLICATIONS

This application is a continuation-in-part of U.S. patent application Ser. No. 09/768,019, filed Jan. 23, 2001, for "Synchronizing a Video Program from a Television Broadcast with a Secondary Audio Program," with inventor Brittany R. Billmaier, which is incorporated herein by reference in its entirety.

BACKGROUND OF THE INVENTION

1. Field of the Invention

The present invention relates generally to interactive television systems. More specifically, the present invention relates to a method and system for synchronizing multiple signals received through different transmission mediums, such as, for example, a cable television signal and a radio signal transmitted via the Internet.

2. Description of Related Background Art

In recent years, the number and quality of transmission mediums for disseminating information and entertainment have greatly expanded. For example, only a few years ago, transmission options were limited to television and radio broadcasts via electromagnetic waves (e.g., VHF, UHF, AM, FM). Today, audio, video, and data transmissions may be received through cable and satellite systems, broadband radio-frequency systems, digital telephone networks (e.g., DSL, ISDN), packet switched networks (e.g., the Internet), and the like.

In many cases, it is advantageous to combine signals received through different transmission mediums. For example, it may be advantageous to combine a cable television signal with a streaming video signal received via the Internet. Likewise, it may be desirable to combine a data transmission received via the Internet with a satellite television signal (e.g., DSS).

Each transmission medium has a particular bandwidth, i.e. the amount of data that can be transmitted in a fixed amount of time. One transmission medium, such as a cable network, might have a relatively high bandwidth, e.g. 10 megabits per second (Mbps), while another medium, such as a DSL or analog telephone line, might have a lower bandwidth, e.g., 256 or 56 kilobits per second (Kbps), respectively. Thus, certain transmission mediums might be better suited to video distribution (which requires a higher bandwidth) while other transmission mediums might be better suited to audio or data distribution (which typically requires a lower bandwidth).

Each transmission medium is also associated with a particular latency, i.e. the time it takes for information to travel from a source computer to a destination computer. For some transmission mediums, such as a cable network, the latency is relatively low. However, in the context of a packet switched network, such as the Internet, the latency can be as high as several seconds.

Differences in latency between two transmission mediums (and other factors) can cause two signals transmitted simultaneously via the different mediums to arrive at different times. Where the delay in receiving the second signal is greater than a few seconds, directly combining the two signals may be undesirable due to the lack of synchronization.

As an example, both radio and television stations traditionally provide coverage for sporting events, such as football, basketball, baseball, etc. Indeed, multiple radio and television stations typically cover an event for both local and national audiences.

Although television offers the apparent advantage of allowing a person to see the sporting event, many prefer the radio for a number of reasons. For example, radio announcers often provide a better commentary since they must rely on words alone to describe the event. Moreover, radio broadcasts typically include fewer commercials, interviews, human interest stories, or the like, which tend to interrupt the event.

To obtain the advantages of both radio and television, some people watch a televised sporting event with the volume muted, while simultaneously listening to a radio commentary by their favorite announcer. As a result, the viewer obtains the benefits of better commentary, fewer interruptions, and the like, while also being able to watch the event. This approach is possible because electromagnetic broadcasts of television and radio signals are typically received at same time with little or no relative delay (both transmissions travel at the speed of light).

Unfortunately, listening to radio coverage of a televised sporting event may not always be possible. For example, for events in remote cities, there may be no locally-broadcast radio coverage. In addition, a user may not be aware of which events are being broadcast on which radio stations.

Today, radio programs are beginning to be broadcast via the Internet. Radio signals are digitized, packetized, and transmitted to a receiver's computer using standard protocols such as TCP/IP (transmission control protocol/Internet protocol). Various standard software programs are available for receiving and playing radio signals transmitted via the Internet, such as RealPlayer Plus®, available from RealNetworks, Inc. of Seattle, Wash.

Advantageously, Internet-based radio transmissions are not geographically limited. Thus, a local radio station in New York City may be received via the Internet at a user's home in Seattle or anywhere else in the world. It is now possible to choose from radio broadcasts from thousands of radio stations around the world via the Internet medium.

Unfortunately, the process including digitizing the radio signal, establishing a communication channel, and transmitting the radio signal via the Internet introduces a delay of several seconds when compared to a television signal transmitted, for example, via a cable network. Moreover, an Internet radio signal may be delayed with respect to a television broadcast for contractual reasons. Thus, the Internet-based radio coverage of a sporting event is delayed in time with respect to the television coverage, making a direct combination of the two undesirable due to lack of synchronization between the two signals.

What is needed, then, is a system and method for synchronizing and combining multiple signals received through different transmission mediums, such as a television signal received through a cable network and a radio signal sent via the Internet.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

The present invention solves the above-described problems and difficulties by providing a method and system for synchronizing multiple signals received through different transmission mediums. For example, a method and system are described for synchronizing a video program transmitted via a cable network with a secondary audio program, such as a radio program, received via the Internet. In another example, a method and system are described for synchronizing a video program transmitted via a cable network with one or more programmed events (for example, directives to perform particular functions, such as displaying text or graphics or animation, playing streaming media, directing a browser to a particular web page, and the like).

Reference throughout the following specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout the following specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
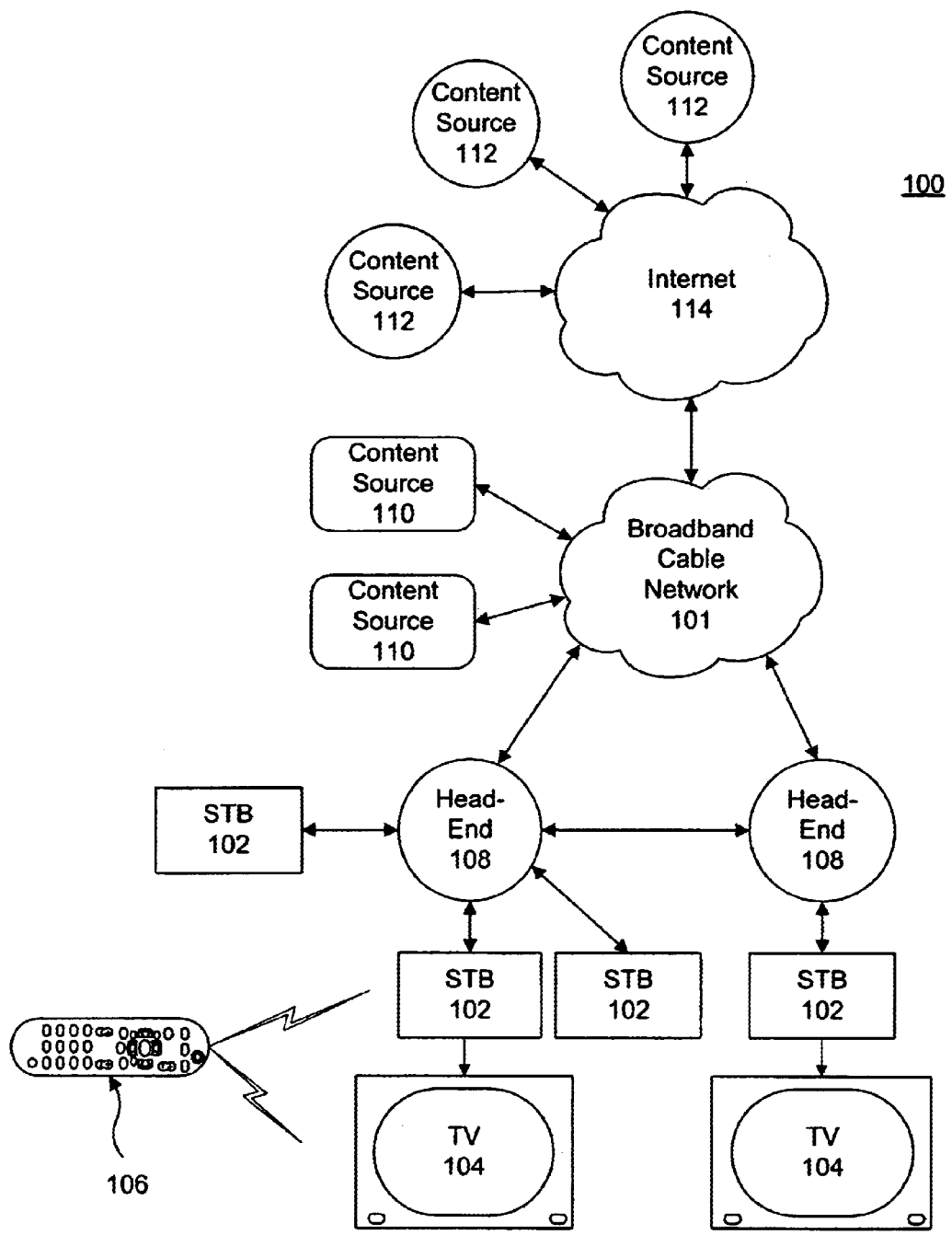
FIG. 1 is a block diagram of a system for distributing television programs and other forms of content.

Referring now to FIG. 1, there is shown a system 100 for delivering television programs and other forms of content to a plurality of customers. In one implementation, the system 100 includes a broadband cable network 101. However, other networks are contemplated, one particular example of which is a satellite network.

In one configuration, the system 100 includes a plurality of set top boxes (STBs) 102 located, for instance, at customer homes. Generally, an STB 102 is a consumer electronics device that serves as a gateway between a customer's television and the network 101. In alternative embodiments, an STB 102 may be embodied more generally as a personal computer, an advanced television set, or another type of client terminal.

An STB 102 receives encoded television signals and other information from the network 101 and decodes the same for display on a coupled television 104 or other display device (such as a computer monitor, flat panel display, or the like). As its name implies, an STB 102 is typically located on top of, or in close proximity to, the television 104.

Each STB 102 may be distinguished from other network components by a unique identifier, number, code, or address, examples of which include an IP (Internet Protocol) address or media access control (MAC) address. Thus, video streams and other information may be transmitted from the network 101 to a specific STB 102 by specifying the corresponding address, after which the network 101 routes the transmission to its destination using conventional techniques.

A remote control 106 is provided, in one embodiment, for convenient remote operation of the STB 102 and the television 104. The remote control 106 may use infrared (IR), radio frequency (RF), or other wireless technologies to transmit control signals to the STB 102 and the television 104. Other remote control devices are also contemplated, such as wired or wireless keyboards (not shown).

In one embodiment, each STB 102 is coupled to the network 101 via a head-end 108 or other distribution center. In the context of a cable network, a head-end 108 is generally a centrally-located facility where television programs are received from a local cable TV (CATV) satellite downlink or other source and packaged together for transmission to customer homes. In one configuration, a head-end 108 also functions as a Central Office (CO) in the telephone industry, routing video streams and other data to and from the various STB 102 devices serviced thereby.

The network 101 is preferably coupled to one or more primary content sources 110. A primary content source 110 may be embodied as a television station, a radio station, a data feed, a streaming audio/video server or other type of information source that provides content for distribution to the STBs 102. Additionally, the network 101 may be coupled to one or more secondary content sources 112. A secondary content source 112 may be a embodied as a television station, a radio station, a data feed, a streaming audio/video server, a web server, or other similar information source.

A content source 110 is designated as "primary" because it is coupled to the STBs 102 via a transmission medium having a relatively low latency, while a "secondary" content source 112 is coupled to the STBs 102 via a transmission medium having a relatively higher latency. Thus, a signal sent from a primary content source 110 is likely to arrive at an STB 102 before a signal sent from a secondary content source 112.

A signal sent by the primary content source 110 is referred to herein as a "primary" signal, and a signal sent by a content source 112 is referred to herein as a "secondary" signal. However, the designation of primary and secondary only refers to the order in which the signal is received, and does not refer, for instance, to the relative importance of the signals or the amount of bandwidth consumed by the signals. In addition, the invention is not limited to two signals. As explained below, it may be desirable to combine three or more signals received through different transmission mediums.

In the depicted embodiment, each primary content source 110 is coupled to the STBs 102 via a broadband cable network 101, which has a relatively low latency. Each secondary content source 112, however, is coupled to the STBs 102 via the Internet 114 (which typically has a higher latency) as well the network 101. The Internet 114 is a "network of networks" and is well known to those skilled in the art. Communication over the Internet 114 is accomplished using standard protocols, such as TCP/IP (transmission control protocol/Internet protocol) and the like. Of course, the invention is not limited to the Internet 114 or the cable network 101 as transmission mediums. For example, in alternative embodiments, satellite networks, digital telephone networks, and the like, may be used.

Figure 2:
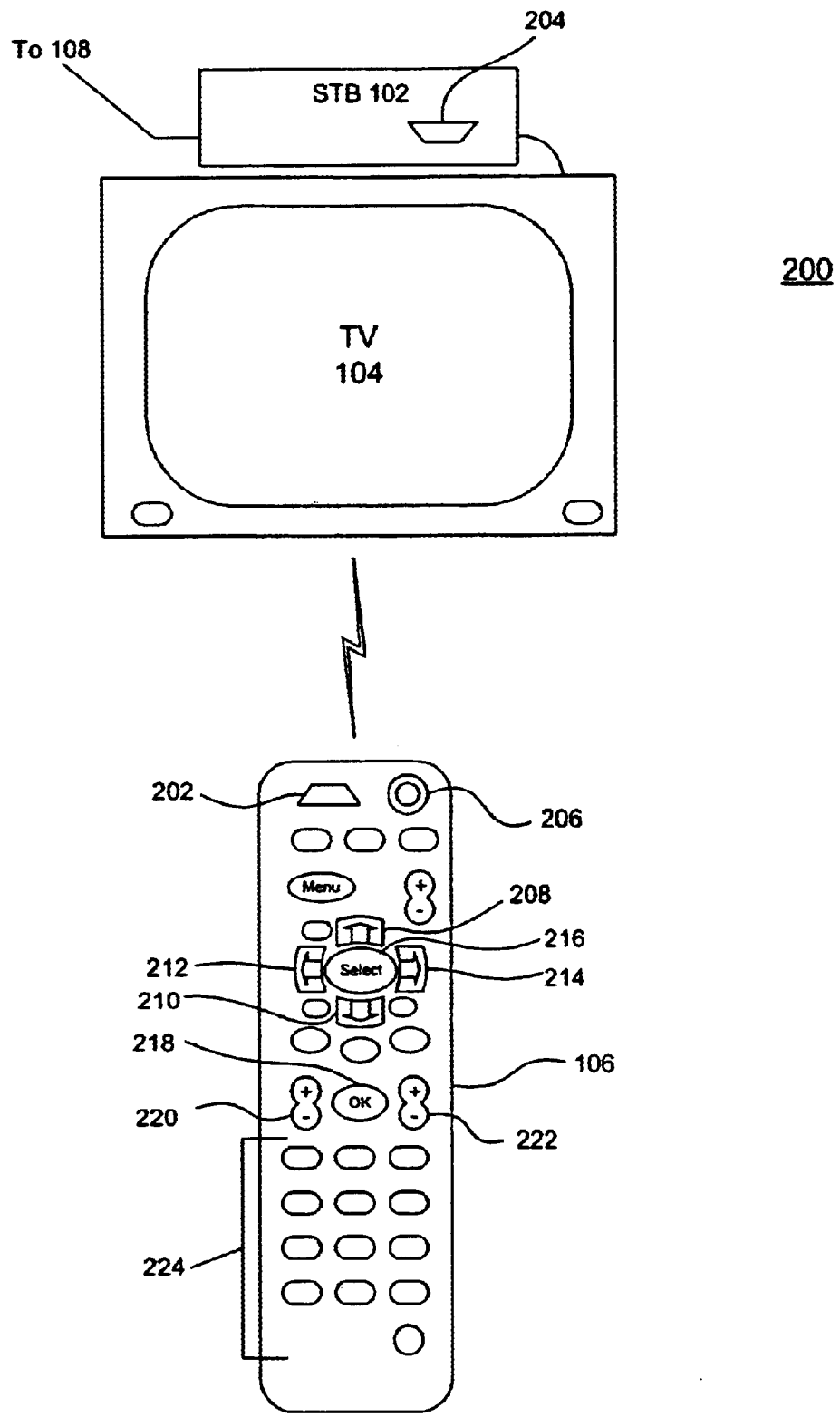
FIG. 2 is a block diagram of an interactive television system.

Referring now to FIG. 2, there is shown an interactive television system 200 according to an embodiment of the invention. As depicted, the system 200 may include an STB 102, a television 104 (or other display device), and a remote control 106. As noted above, the STB 102 is used to access the network 101 via a head-end 108. In an alternate embodiment, the functionality of the STB 102 is integrated into an advanced version of the television 104.

As noted, the remote control 106 is provided for convenient remote operation of the STB 102 and the television 104, although a remote control 106 is not required in every embodiment. In one configuration, control signals are transmitted from a wireless transmitter 202 in the remote control 106 to a wireless receiver 204 in the STB 102 (and television 104).

In various embodiments, the remote control 106 includes a plurality of buttons or similar controls. For instance, the remote control 106 may include a power button 206, an up arrow button 208, a down arrow button 210, a left arrow button 212, a right arrow button 214, a "Select" button 216, an "OK" button 218, channel buttons 220, volume buttons 222, and alphanumeric buttons 224. The functions of certain of the above-identified buttons will be discussed in greater detail below.

Figure 3:
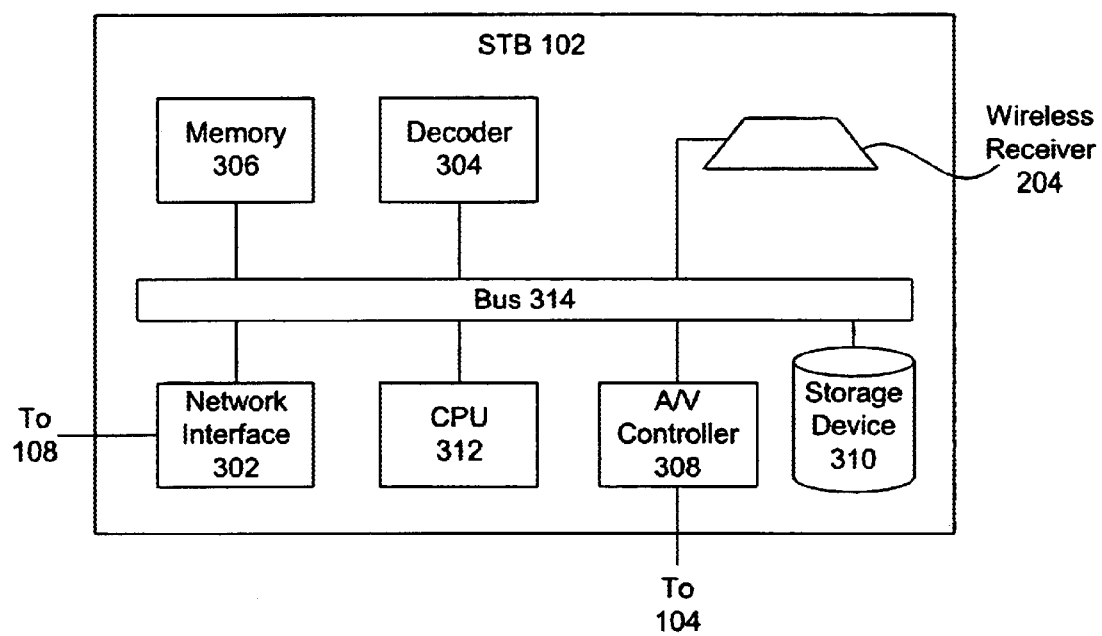
FIG. 3 is a block diagram of physical components of a set top box.

Referring now to FIG. 3, there is shown a physical block diagram of an STB 102 according to an embodiment of the invention. As noted above, the STB 102 includes a wireless receiver 204 for receiving control signals sent by the wireless transmitter 202 in the remote control 106. In various embodiments, the receiver 204 may be configured to receive IR, microwave, VHF, UHF, or other electromagnetic frequencies.

The STB 102 also includes, in one implementation, a network interface 302 for communicating with the network 101 via the head-end 108. The interface 302 may include conventional tuning circuitry for receiving MPEG (Moving Picture Experts Group) packets for a selected television channel. The interface 302 may also include conventional cable modem circuitry for sending or receiving other types of data. For example, the interface 302 may conform to the DOCSIS (Data Over Cable Service Interface Specification) or DAVIC (Digital Audio-Visual Council) standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission is accomplished differently for different networks 101. Alternative ways to accomplish upstream transmission include using a back channel transmission, which is typically sent via an analog telephone line, ISDN, DSL, or other techniques.

In one implementation, the STB 102 also includes a decoder 304, such as an MPEG decoder, for decoding packets received from the network 101. As depicted, the decoder 304 may be implemented as a hardware component. Alternatively, or in addition, software decoding may be used.

The STB 102 further includes a memory device 306, such as a random access memory (RAM), configured to store data for temporary use. Similarly, a read-only memory (ROM) may be provided for storing more permanent data, such as fixed code and configuration information.

In one embodiment, an audio/video controller 308 is provided for converting decoded digital audio/video information into analog signals for display/playback on the television 104 or attached stereo system (not shown). In alternative embodiments, the audio/video (A/V) controller 308 may provide a direct, digital video output for televisions 104 or stereo systems equipped to receive the same. Preferably, the A/V controller 308 includes graphics hardware for performing bit-block transfers (bit-blits) and other graphical operations.

In some implementations, the STB 102 may include a storage device 310, such as a hard disk drive or the like. The storage device 310 may be configured to record encoded television broadcasts and retrieve the broadcasts at a later time for decoding by the decoder 304 and display by the A/V controller 308.

The storage device 310 may also be used in various embodiments to store viewer preferences, parental lock settings, electronic programming guide (EPG) data, programming preferences, passwords, e-mail messages, information requests, and the like. In one implementation, the storage device 310 also stores an operating system (OS) for the STB 102, such as Windows CE® or Linux®.

A CPU 312 controls the operation of the STB 102, including the other components thereof, which are coupled to the CPU 312 via a bus 314. The CPU 312 may be embodied as a microprocessor, a microcontroller, a digital signal processor (DSP) or other device known in the art. As noted above, the CPU 312 may perform these and other operations based upon control signals generated by the remote control 106 and transmitted to the receiver 204.

Of course, FIG. 3 illustrates only one possible configuration of an STB 102. Those skilled in the art will recognize that various other architectures and components may be provided within the scope of the invention. In addition, various standard components of typical STB 102 are not illustrated in order to avoid obscuring aspects of the invention.

Figure 4:
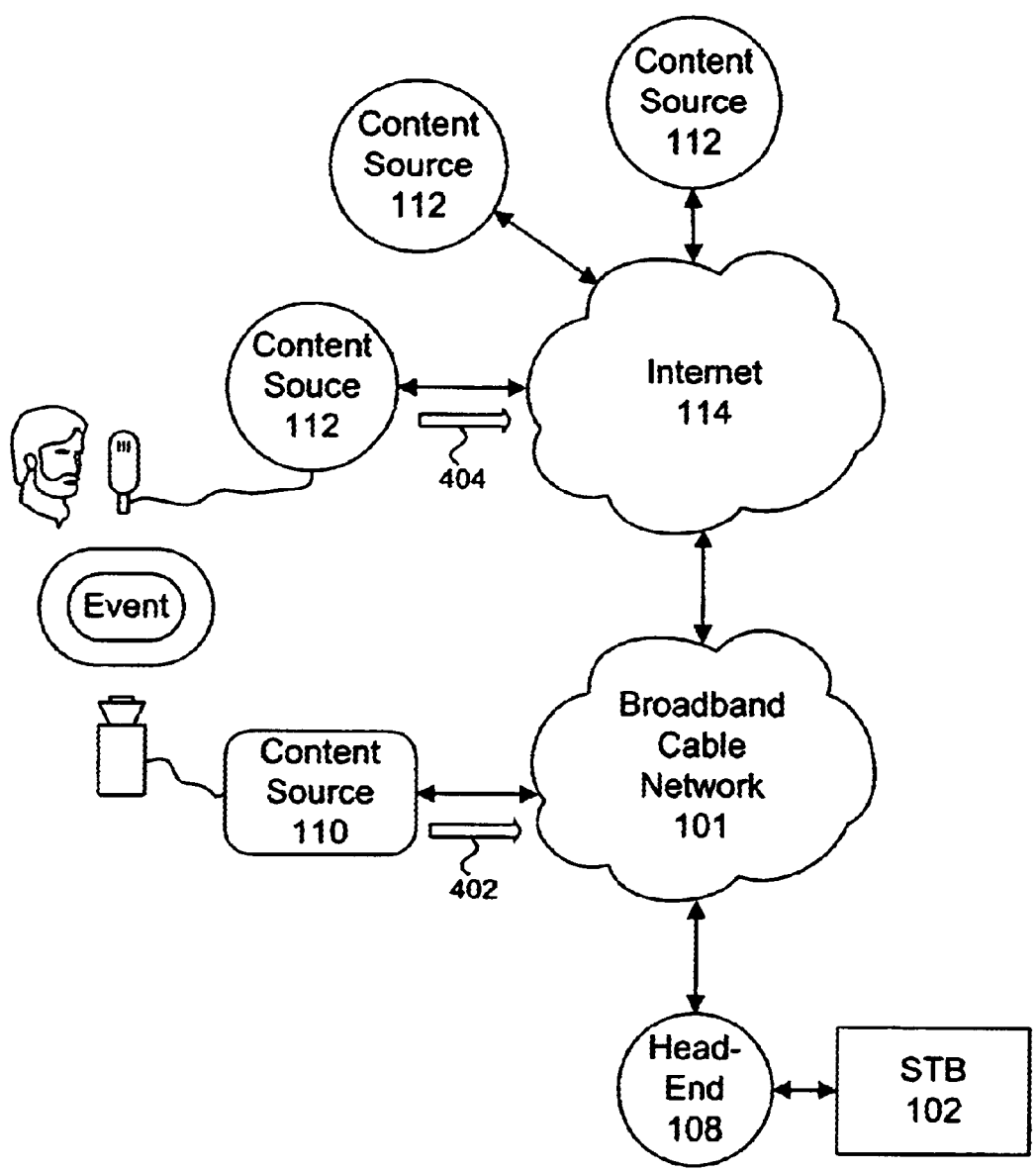
FIG. 4 illustrates the simultaneous capturing of two signals for transmission via different mediums.

Referring now to FIG. 4, a primary content source 110 generates a primary signal 402, while a secondary content source 112 generates a secondary signal 404. In the depicted embodiment, both of the signals 402, 404 relate to the same event, e.g., simultaneous radio and television coverage of a sporting event, although this is not a requirement.

Typically, a signal 402 transmitted via the cable network 101 will reach the STB 102 before a signal 404 sent through both the Internet 114 and the network 101. As noted above, the invention is not limited to the Internet 114 and the cable network 101. Other embodiments may be provided that include, for example, a satellite network or digital telephone network. Thus, the invention should be construed as being limited to configuration illustrated in FIG. 4.

Because the primary signal 402 arrives before the secondary signal 404, a direct mixing of the signals 402, 404 would be undesirable because the two would not be synchronized. For example, if the primary signal 402 represented television coverage of a football game and the secondary signal 404 represented a simultaneous radio commentary, the secondary signal 404 would be describing events shown earlier in the primary signal 402.

Figure 5:
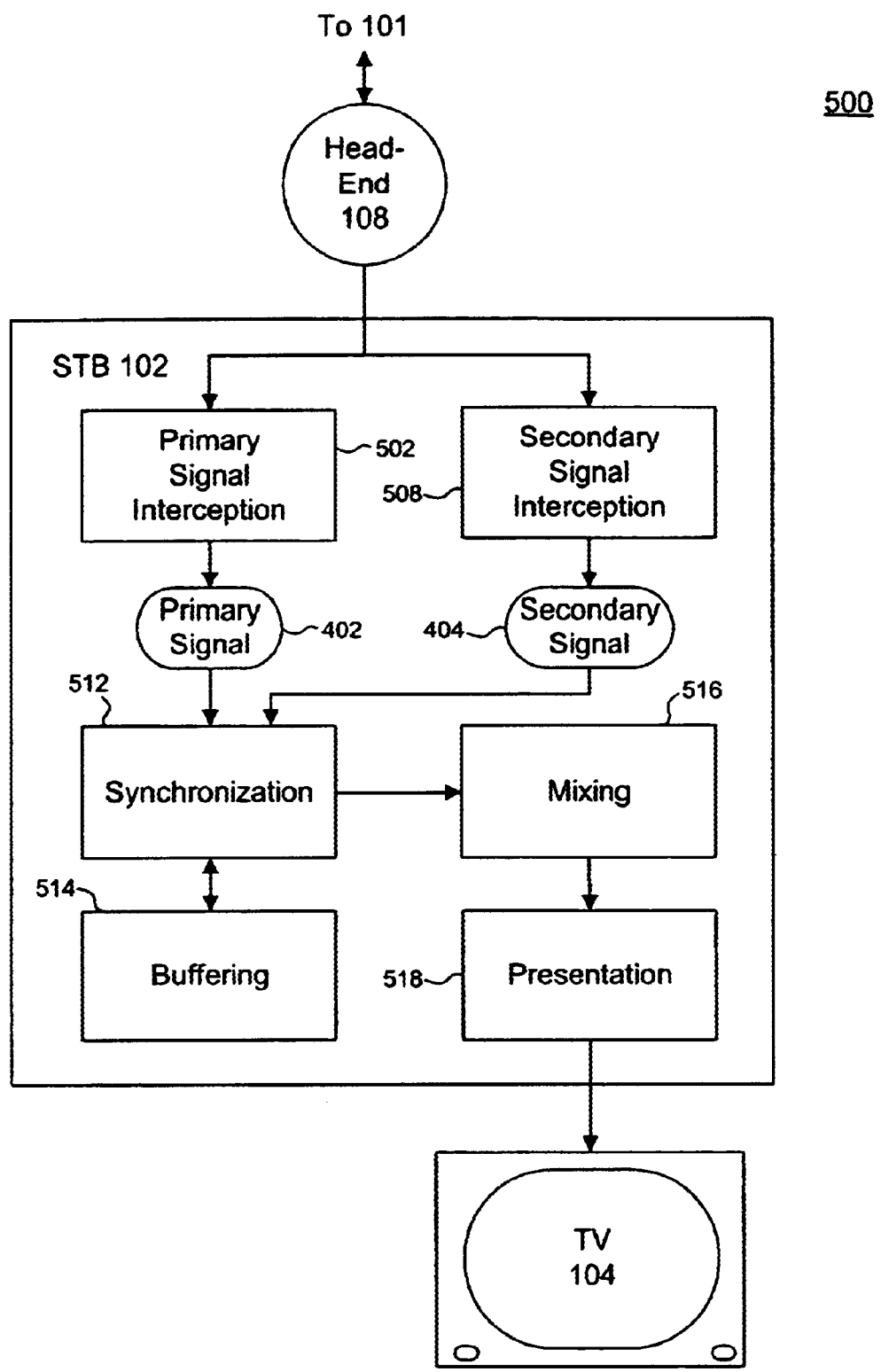
FIG. 5 is a block diagram of logical components of a system for synchronizing multiple signals received via different transmission mediums.

FIG. 5 is a block diagram of various logical components of a system 500 for synchronizing a primary signal 402 with a secondary signal 404. The depicted logical components may be implemented using one or more of the physical components shown in FIG. 3. Additionally, or in the alternative, various logical components may be implemented as software modules stored in the memory 306 and/or storage device 310 and executed by the CPU 312.

In the depicted embodiment, a primary signal interception component 502 intercepts a primary signal 402 as it is received from the head-end 108. The primary signal interception component 502 may utilize, for example, the network interface 302 of FIG. 3 to receive the primary signal 402 from the head-end 108. The primary signal 402 may include encoded television signals, streaming audio, streaming video, flash animation, graphics, text, or other forms of content.

Concurrently, a secondary signal interception component 508 intercepts the secondary signal 404 as it is received from the head-end 108. As with the primary signal 402, the secondary signal 404 may include encoded television signals, streaming audio, streaming video, flash animation, graphics, text, or other forms of content. In one embodiment, the signal interception components 502, 508 are logical sub-components components of a single physical component or software program.

Due to the factors noted above, reception of the secondary signal 404 may be delayed by several seconds with respect to the primary signal 402. Thus, if the secondary signal 404 were simply mixed with the unsynchronized primary signal 402, the results would be undesirable because the two are not synchronized.

Accordingly, a synchronization component 512 is provided to synchronize the primary signal 402 with the secondary signal 404. As illustrated, the synchronization component 512 may include or make use of a buffering component 514 to buffer the primary signal 402 for a period of time approximately equal to the relative transmission delay between the two signals 402, 404. As explained in greater detail below, the buffering period may be preselected, user-adjustable, and/or calculated.

In one implementation, the buffering component 514 includes or makes use of the storage device 310 or the memory 306 of FIG. 3 to buffer the primary signal 402. For instance, the buffering component 514 may be embodied as a personal video recorder (PVR) device, one particular example of which is TiVo®, available from TiVo, Inc. of Alviso, Calif. A PVR typically includes a hard disk drive, an MPEG encoder/decoder, and various other hardware and software components to facilitate recording and playback of television programs. The hard disk drive typically has a capacity of 20–40 GB in order to facilitate recording of several hours of television programs.

Advantageously, a PVR, such as TiVo, often includes a feature for "pausing" television broadcasts. For example, when a pause button or the like is pressed, the displayed television program freezes while the PVR records the portion of the broadcast not displayed. When the pause button is pressed again, the PVR resumes the television program (using the recorded data) while simultaneously continuing to record the television program being currently broadcast. Thus, in one implementation, the pause feature may be activated for a period of the transmission delay.

Of course, other types of buffering components 514 may be used, one example of which is the memory 306 of the STB 102. In such an embodiment, several megabytes of random access memory (RAM) would be desirable in order to compensate for the relative transmission delay.

In certain embodiments, it may be advantageous to combine more than two signals received through different transmission mediums. To achieve proper synchronization, the last signal to be received may be designated as the "secondary" signal 404. Each of the earlier-received signals may then be designated, in turn, as a "primary" signal 402 and individually synchronized with the secondary signal 404 according to a different relative transmission delay, if necessary.

In one embodiment, a mixing component 516 mixes the synchronized primary signal 402 with the secondary signal 404 prior to presentation. How the signals 402, 404 are mixed depends on the types of signals 402, 404. For example, where the primary signal 402 is a television broadcast (including a video signal and an audio signal) and the secondary signal 404 is a radio signal, the mixing process may involve replacing the audio signal from the television broadcast with the radio signal. Various techniques are known for substituting one audio channel for another. The mixing may be performed by the CPU 312 or by specialized audio hardware known in the art.

Alternatively, where the secondary signal 404 includes text to be displayed in connection with a television broadcast contained within the primary signal 402, the mixing process may involve superimposing the text over the television broadcast using graphics hardware provided in the A/V controller 308 of FIG. 3. For other types of signals 402, 404, different mixing techniques may be used as will be known to those skilled in the art.

Finally, a presentation component 518 presents the combination of the primary signal 402 and the secondary signal 404 to the user. The presentation component 518 may rely on the A/V controller 308 and other standard circuitry to send the primary signal 402 and the secondary signal 404 to the television 104.

Figure 6:
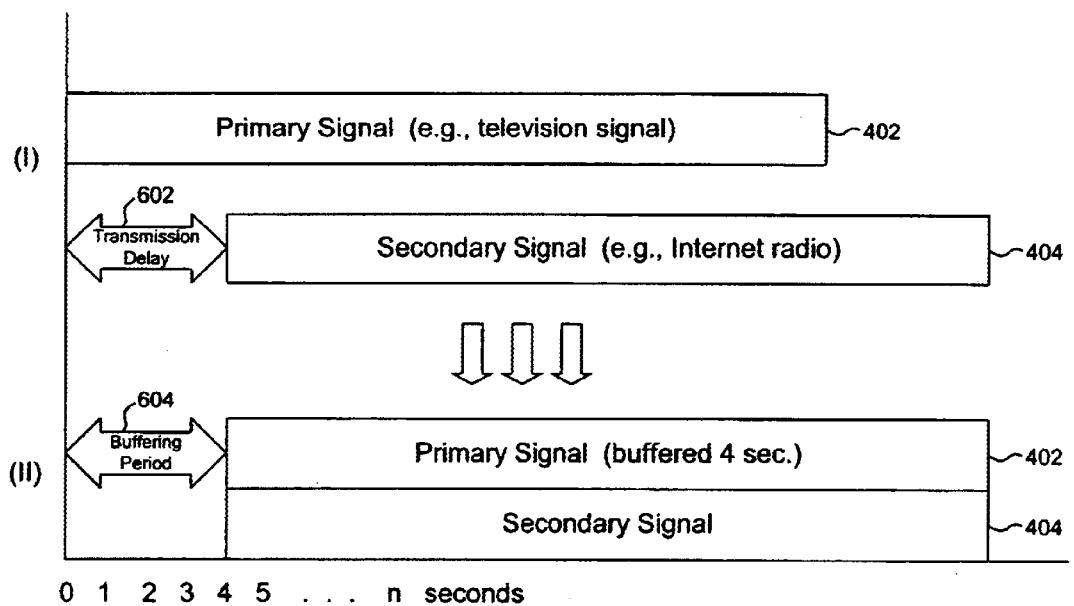
FIG. 6 is a time graph illustrating synchronization of a primary signal with a secondary signal received after a delay period.

FIG. 6 is a time graph illustrating the above-described synchronization process. In section (I), a primary signal 402, such as a television signal, is received at time 0. Due to the factors mentioned above, a secondary signal 404, such as an radio signal received via the Internet 114, arrives four (4) seconds later due to an relative transmission delay 602.

Section (II) shows the primary signal 402 after the buffering component 514 buffers the primary signal 402 for a buffering period 604 of four (4) seconds and the mixing component 516 mixes primary signal 402 with the secondary signal 404.

As previously noted, the buffering period 604 may be pre-selected, user-adjustable, and/or calculated. For example, a typical relative delay 602 resulting from transmission over the Internet 114 may range between two and five seconds, more often between three and four seconds. Accordingly, a default buffering period 604 may be set to between three seconds and four seconds.

However, an actual relative transmission delay 602 may deviate from the default value. Depending on the magnitude of the deviation, the buffering period 604 may require adjustment by the user. In one embodiment, the primary signal 402 is buffered for a default buffering period 604, e.g., three or four seconds. Thereafter, the synchronized primary signal 402 and secondary signal 404 may be mixed and presented to the user. Preferably, the user is provided with a mechanism for adjusting the buffering period 604 in order to manually synchronize the primary signal 402 with the secondary signal 404.

Figure 7:
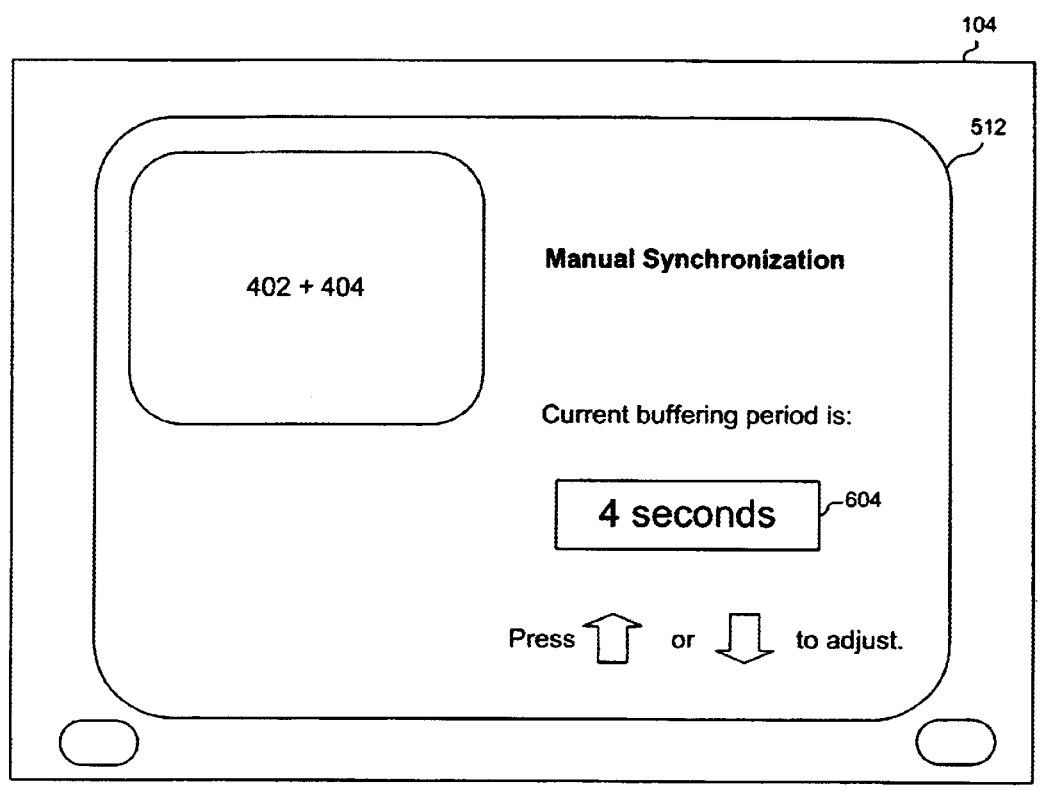
FIG. 7 is a user interface for manually synchronizing a two signals received by an interactive-television system.

For example, as shown in FIG. 7, the synchronization component 512 may provide a user interface in which the synchronized primary signal 402 and secondary signal 404 are displayed with an indication of the buffering period 604. If the current buffering period 604 is greater or less than the transmission delay 602, the user may adjust the buffering period 604, for example, by pressing the up or down buttons 208, 210 on the remote control 106. Preferably, after each adjustment, the primary signal 402 is re-synchronized with the secondary signal 404 according to the new buffering period 604, allowing the user to fine tune the synchronization of the two signals 402, 404.

Figure 8:
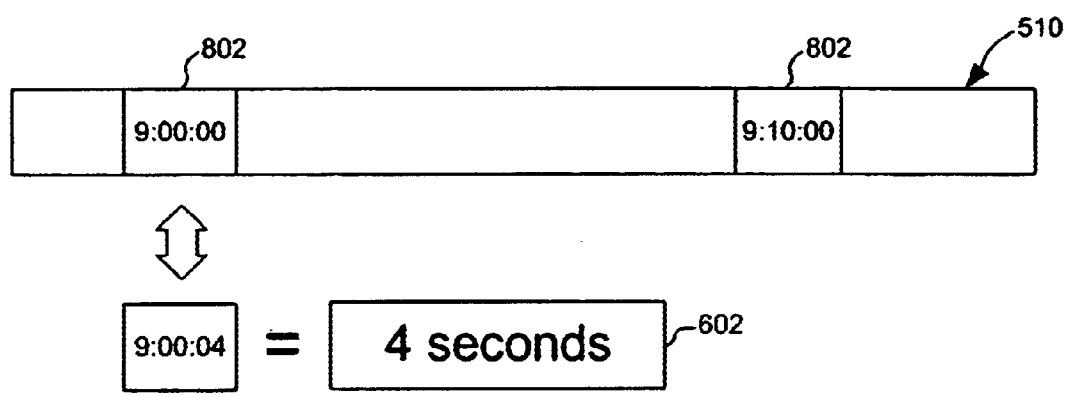
FIG. 8 is an illustration of synchronization packets within a secondary signal.

In an alternative embodiment, as shown in FIG. 8, the relative transmission delay 602 is calculated using synchronization packets 802 included with the secondary signal 404. Each synchronization packet 802 may include a time index, which indicates a time at which the corresponding portion of the secondary signal 404 was sent. Accordingly, the relative transmission delay 602 may be calculated by comparing a time index from a synchronization packet 802 with an indication of the time at which the synchronization packet 802 is received by the secondary signal interception component 508.

For instance, as shown in FIG. 8, a synchronization packet 802 may include a time index of 9:00:00, indicating that the corresponding portion of the secondary signal 404 was sent at precisely 9:00 AM. However, suppose the synchronization packet 802 is received by the audio program reception component 508 at 9:00:04 (or four seconds after 9:00 AM). In such a case, the synchronization module 512 may determine the relative transmission delay 602 to be approximately four seconds.

Synchronization packets 802 may be inserted into the secondary signal 404 at any suitable frequency in order to permit rapid determination of the relative transmission delay 602. While the above description uses an index with precision to one second for purposes of illustration, the present invention contemplates using an indices or timestamps which are precise to small fractions of a second. For example, MPEG timestamps may be utilized in this regard.

Of course, other techniques may be used to calculate the relative transmission delay 602. For example, various utilities (e.g., PING) may be used to calculate network latency.

Figure 9:
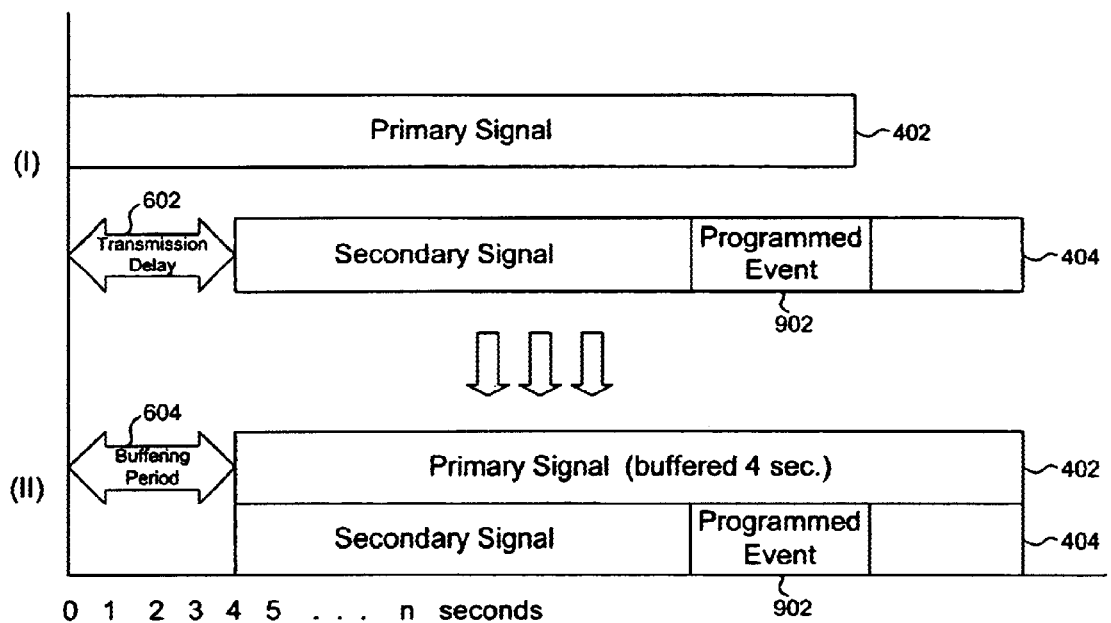
FIG. 9 is a time graph illustrating synchronization of a primary signal with a secondary signal including one or more programmed events.

FIG. 9 illustrates yet another embodiment of the invention in which the primary signal 402 is synchronized with one or more programmed events 902 encoded within the secondary signal 404. A programmed event 902 is a directive to the STB 102 to perform a particular function, such as displaying text or icons or graphics or animation (for example, flash animation), playing streaming media such as video or music or audio clips, directing a browser to a particular web page, or the like.

For example, suppose a primary signal 402 includes a television broadcast of a baseball game. A producer of a secondary signal 404 may include a programmed event 902 within a secondary signal 404 to display the career statistics of a baseball player who just hit a home run. Likewise, the producer may include a programmed event 902 to display a graphical overlay of fireworks during the home run.

Because such programmed events 902 may be received via the Internet 114 (or other transmission medium having a relatively high latency), they may also be subject to the transmission delay 602. Thus, a firework display configured to coincide with a home run may be delayed by several seconds. However, because the present invention synchronizes the primary signal 402 with the secondary signal 404, the programmed events 902 are likewise synchronized.

Figure 10:
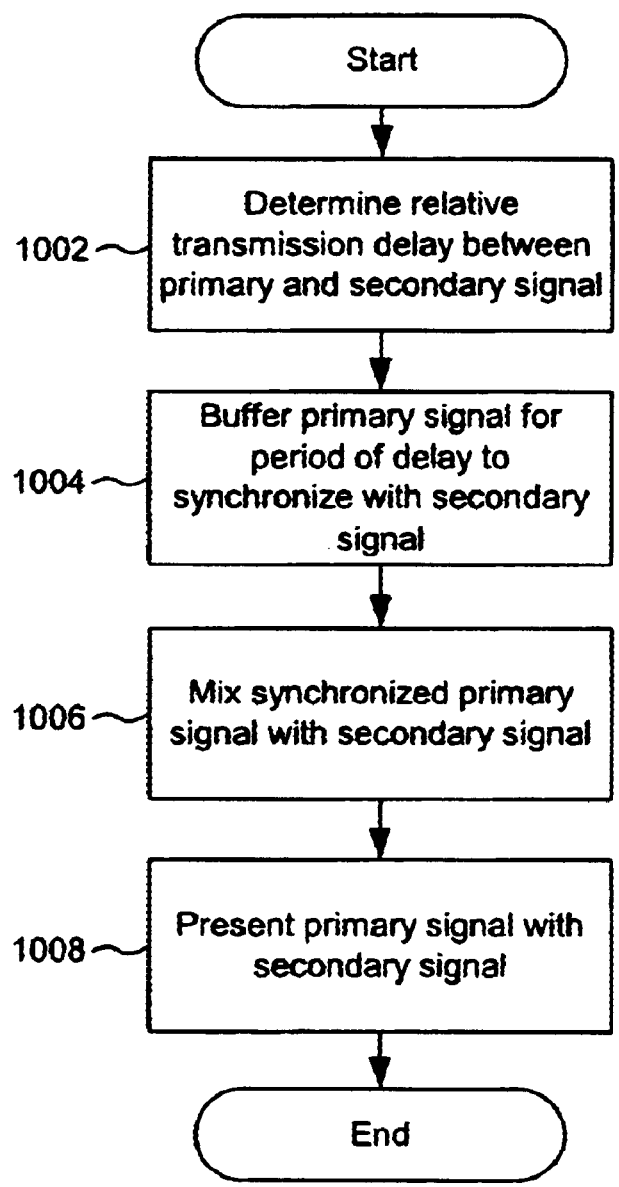
FIG. 10 is a flowchart of a method for synchronizing multiple signals received via different transmission mediums.

FIG. 10 is a flowchart of a method 1000 for synchronizing multiple signals received through different transmission mediums. The method 1000 begins by determining 1002 a relative transmission delay 602 between a primary signal 402 (such as a television signal) and a secondary signal 404 (such as a radio signal received via the Internet 114). Thereafter, the primary signal 402 is buffered 1004 in a storage device 310 for a period of time equal to the relative transmission delay 602 in order to synchronize it with the secondary signal 404. Next, the synchronized primary signal 402 is mixed 1006 with the secondary signal 404. Finally, the primary signal 402 is presented 1008 with the secondary signal 904 on a television 104 or other display device.

In view of the foregoing, the present invention offers numerous advantageous not available in conventional approaches. For example, the present invention includes a system and method for synchronizing multiple signals received through different transmission mediums. For example, a method and system are described for synchronizing a video program transmitted via a cable network with a secondary audio program, such as a radio program, received via the Internet. In another example, a method and system are described for synchronizing a video program transmitted via a cable network with one or more programmed events (for example, directives to perform particular functions, such as displaying text or graphics or animation, playing streaming media, directing a browser to a particular web page, and the like).

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for synchronizing at least two signals sent to a receiving device through different transmission mediums, the method comprising:

intercepting a first signal received through a first transmission medium;

intercepting a second signal received through a second transmission medium, wherein the second transmission medium has a higher latency than the first transmission medium resulting in a relative transmission delay between the second signal and the first signal;

synchronizing the first signal with the second signal to compensate for the transmission delay; and presenting the first and second signals on a display device;

wherein the first signal comprises a television signal and the second signal comprises a radio signal received via the Internet.

2. A method for synchronizing at least two signals sent to a receiving device through different transmission mediums, the method comprising:

intercepting a first signal received through a first transmission medium;

intercepting a second signal received through a second transmission medium, wherein the second transmission medium has a higher latency than the first transmission medium resulting in a relative transmission delay between the second signal and the first signal;

synchronizing the first signal with the second signal to compensate for the transmission delay; and presenting the first and second signals on a display device;

wherein the first signal comprises a television signal and the second signal comprises a data stream including at least one programmed event.

3. A method for synchronizing at least two signals sent to a receiving device through different transmission mediums, the method comprising:

intercepting a first signal received through a first transmission medium;

intercepting a second signal received through a second transmission medium, wherein the second transmission medium has a higher latency than the first transmission medium resulting in a relative transmission delay between the second signal and the first signal;

synchronizing the first signal with the second signal to compensate for the transmission delay; and presenting the first and second signals on a display device;

wherein presenting comprises mixing the first signal with the second signal.

4. The method of claim 3, wherein the first signal comprises a television signal and the second signal comprises a radio signal, and wherein mixing comprises:

replacing an audio signal associated with the television signal with the radio signal.

5. A method for synchronizing at least two signals sent to a receiving device through different transmission mediums, the method comprising:

intercepting a first signal received through a first transmission medium;

intercepting a second signal received through a second transmission medium, wherein the second transmission medium has a higher latency than the first transmission medium resulting in a relative transmission delay between the second signal and the first signal;

synchronizing the first signal with the second signal to compensate for the transmission delay; and presenting the first and second signals on a display device;

wherein synchronizing comprises buffering the first signal in a storage device for a period of time equal to the relative transmission delay between the first signal and the second signal; and wherein the storage device comprises a personal video recorder (PVR) device.

6. A method for synchronizing at least two signals sent to a receiving device through different transmission mediums, the method comprising:

intercepting a first signal received through a first transmission medium;

intercepting a second signal received through a second transmission medium, wherein the second transmission medium has a higher latency than the first transmission medium resulting in a relative transmission delay between the second signal and the first signal;

synchronizing the first signal with the second signal to compensate for the transmission delay; and presenting the first and second signals on a display device;

wherein synchronizing comprises determining the relative transmission delay between the first and second signals and buffering the first signal in a storage device for a period equal of time equal to the relative transmission delay between the first and second signals; and wherein the second signal comprises a time index, and wherein determining comprises comparing the time index from the second signal with an indication of a time at which the time index is received with the second signal.

7. A method for synchronizing at least two signals sent to a receiving device through different transmission mediums, the method comprising:

intercepting a first signal received through a first transmission medium;

intercepting a second signal received through a second transmission medium, wherein the second transmission medium has a higher latency than the first transmission medium resulting in a relative transmission delay between the second signal and the first signal;

synchronizing the first signal with the second signal to compensate for the transmission delay; and presenting the first and second signals on a display device;

wherein synchronizing comprises determining the relative transmission delay between the first and second signals and buffering the first signal in a storage device for a period equal of time equal to the relative transmission delay between the first and second signals; and wherein determining comprises:
 buffering the first signal in the storage device for a default buffering period;
 presenting the first signal with the second signal;
 adjusting the buffering period in response to user feedback; and
 buffering the first signal in the storage device for the adjusted buffering period.

8. The method of claim 2, wherein the at least one programmed event is selected from the group consisting of: displaying text; displaying icons; displaying graphics; displaying animation; playing streaming video; playing streaming music; playing streaming audio; and directing a browser to a particular page.

9. The method of claim 2, wherein synchronizing comprises:

buffering the first signal for a period of time equal to the relative transmission delay between the first signal and the second signal.

10. The method of claim 3, wherein synchronizing comprises:

buffering the first signal for a period of time equal to the relative transmission delay between the first signal and the second signal.

11. A system for synchronizing at least two signals sent to a receiving device through different transmission mediums, the method comprising:

a first signal interception component configured to intercept a first signal received through a first transmission medium;

a second interception component configured to intercept a second signal received through a second transmission medium, wherein the second transmission medium has a higher latency than the first transmission medium resulting in a relative transmission delay between the second signal and the first signal;

a synchronization component configured to synchronize the first signal with the second signal to compensate for the transmission delay; and a presentation component configured to present the first and second signals on a display device;

wherein the first signal comprises a television signal and the second signal comprises a radio signal received via the Internet.

12. A system for synchronizing at least two signals sent to a receiving device through different transmission mediums, the method comprising:

a first signal interception component configured to intercept a first signal received through a first transmission medium;

a second interception component configured to intercept a second signal received through a second transmission medium, wherein the second transmission medium has a higher latency than the first transmission medium resulting in a relative transmission delay between the second signal and the first signal;

a synchronization component configured to synchronize the first signal with the second signal to compensate for the transmission delay; and a presentation component configured to present the first and second signals on a display device;

wherein the first signal comprises a television signal and the second signal comprises a data stream including at least one programmed event.

13. The system of claim 12, wherein the at least one programmed event is selected from the group consisting of: displaying text; displaying icons; displaying graphics; displaying animation; playing streaming video; playing streaming music; playing streaming audio; and directing a browser to a particular page.

14. A system for synchronizing at least two signals sent to a receiving device through different transmission mediums, the method comprising:

a first signal interception component configured to intercept a first signal received through a first transmission medium;

a second interception component configured to intercept a second signal received through a second transmission medium, wherein the second transmission medium has a higher latency than the first transmission medium resulting in a relative transmission delay between the second signal and the first signal;

a synchronization component configured to synchronize the first signal with the second signal to compensate for the transmission delay;

a presentation component configured to present the first and second signals on a display device; and a mixing component configured to mix the first signal with the second signal before presentation thereof by the presentation component.

15. The system of claim 14, wherein the first signal comprises a television signal and the second signal comprises a radio signal, and wherein the mixing component is further configured to replace an audio signal associated with the television signal with the radio signal.

16. A system for synchronizing at least two signals sent to a receiving device through different transmission mediums, the method comprising:

a first signal interception component configured to intercept a first signal received through a first transmission medium;

a second interception component configured to intercept a second signal received through a second transmission medium, wherein the second transmission medium has a higher latency than the first transmission medium resulting in a relative transmission delay between the second signal and the first signal;

a synchronization component configured to synchronize the first signal with the second signal to compensate for the transmission delay;

a presentation component configured to present the first and second signals on a display device; and a buffering component configured to buffer the first signal in a storage device for a period of time equal to the relative transmission delay between the first signal and the second signal;

wherein the storage device comprises a personal video recorder (PVR) device.

17. A system for synchronizing at least two signals sent to a receiving device through different transmission mediums, the method comprising:

a first signal interception component configured to intercept a first signal received through a first transmission medium;

a second interception component configured to intercept a second signal received through a second transmission medium, wherein the second transmission medium has a higher latency than the first transmission medium resulting in a relative transmission delay between the second signal and the first signal;

a synchronization component configured to synchronize the first signal with the second signal to compensate for the transmission delay, wherein the synchronization component is further configured to determine the relative transmission delay between the first and second signals;

a presentation component configured to present the first and second signals on a display device; and a buffering component configured to buffer the first signal in a storage device for a period equal of time equal to the relative transmission delay between the first and second signals;

wherein the second signal comprises a time index, and wherein the synchronization component is further configured to compare the time index from the second signal with an indication of a time at which the time index is received with the second signal.

18. A system for synchronizing at least two signals sent to a receiving device through different transmission mediums, the method comprising:

a first signal interception component configured to intercept a first signal received through a first transmission medium;

a second interception component configured to intercept a second signal received through a second transmission medium, wherein the second transmission medium has a higher latency than the first transmission medium resulting in a relative transmission delay between the second signal and the first signal;

a synchronization component configured to synchronize the first signal with the second signal to compensate for the transmission delay, wherein the synchronization component is further configured to determine the relative transmission delay between the first and second signals;

a presentation component configured to present the first and second signals on a display device; and a buffering component configured to buffer the first signal in a storage device for a period equal of time equal to the relative transmission delay between the first and second signals;

wherein the buffering component is further configured to buffer the first signal in the storage device for a default buffering period;

wherein the presentation component is further configured to present the first signal with the second signal; and wherein the synchronization component is further configured to adjust the buffering period in response to user feedback.

19. The system of claim 11, further comprising:

a buffering component configured to buffer the first signal for a period of time equal to the relative transmission delay between the first signal and the second signal.

20. The system of claim 12, further comprising:

a buffering component configured to buffer the first signal for a period of time equal to the relative transmission delay between the first signal and the second signal.

* * * * *